(12) United States Patent
Chavez-Pirson et al.

(10) Patent No.: US 7,289,707 B1
(45) Date of Patent: Oct. 30, 2007

(54) MULTI-CORE OPTICAL FIBER IMAGE AMPLIFIER AND METHOD OF DRAWING

(75) Inventors: Arturo Chavez-Pirson, Tucson, AZ (US); Shibin Jiang, Tucson, AZ (US); Wenyan Tian, Tucson, AZ (US); Dan Nguyen, Tucson, AZ (US); Tao Luo, Tucson, AZ (US); Bor-Chyuan Hwang, Tucson, AZ (US)

(73) Assignee: NP Photonics, inc, Tucson, AZ (US)

( * ) Notice: Subject to any disclaimer, the term of this patent is extended or adjusted under 35 U.S.C. 154(b) by 0 days.

(21) Appl. No.: 11/433,264

(22) Filed: May 12, 2006

(51) Int. Cl.
*G02B 6/06* (2006.01)
(52) U.S. Cl. .................................................. 385/116
(58) Field of Classification Search ................ 385/28, 385/33, 42, 43, 115–119, 123, 124, 141, 126, 385/142, 147; 372/18, 22
See application file for complete search history.

(56) References Cited

U.S. PATENT DOCUMENTS

| | | | | |
|---|---|---|---|---|
| 5,291,501 | A * | 3/1994 | Hanna | 372/6 |
| 5,566,196 | A * | 10/1996 | Scifres | 372/6 |
| 5,878,159 | A * | 3/1999 | Taleblou et al. | 382/128 |
| 2002/0094159 | A1* | 7/2002 | Goldberg et al. | 385/27 |
| 2003/0137722 | A1* | 7/2003 | Nikolajsen et al. | 359/341.1 |
| 2003/0202547 | A1* | 10/2003 | Fermann et al. | 372/6 |
| 2004/0037554 | A1* | 2/2004 | Ferguson et al. | 398/28 |
| 2004/0247268 | A1* | 12/2004 | Ishihara et al. | 385/117 |

OTHER PUBLICATIONS

S. Breugnot et al. "Low-noise preamplifier for multistage photorefractive image amplification" Optics Letters, vol. 20, No. 14, p. 1568, Jul. 15, 1995.
Sang-Kyung Choi et al. "Noiseless Optical Amplification of Images" Physical Review Letters, vol. 83, No. 10, p. 1938, Sep. 6, 1999.
E. Lantz et al. "Parametric amplification of images" Quantum Semiclass. Opt. 9 (1977) 279-286.
R. T. Eagleton et al. "Dynamic Range measurements on streak image tubes with internal and external microchannel plate image amplification", Review of Scientific Instruments, vol. 74, No. 3, pp. 2215-2219, Mar. 2003.

* cited by examiner

*Primary Examiner*—Frank G. Font
*Assistant Examiner*—Hung Lam
(74) *Attorney, Agent, or Firm*—Eric A. Gifford

(57) ABSTRACT

A low-noise, high-gain optical image amplifier includes a multi-mode pump source that injects optical energy into an active fiber's inner cladding to excite the dopant ions in a 2-D array of doped cores and provide gain. The cores are arranged to sample and collect light from an image incident on one end of the fiber, amplify the light and output an amplified pixilated image at the other end of the fiber. The multi-core active fiber preserves the spatial pattern and spectrum of the incident image. The cores may be configured as single-mode cores to preserve phase information or multi-mode cores to scramble the phase information. It is often desirable for the gain to be approximately uniform across the 2-D array. This can be achieved by pumping uniformly doped cores into their respective saturation regions.

13 Claims, 9 Drawing Sheets

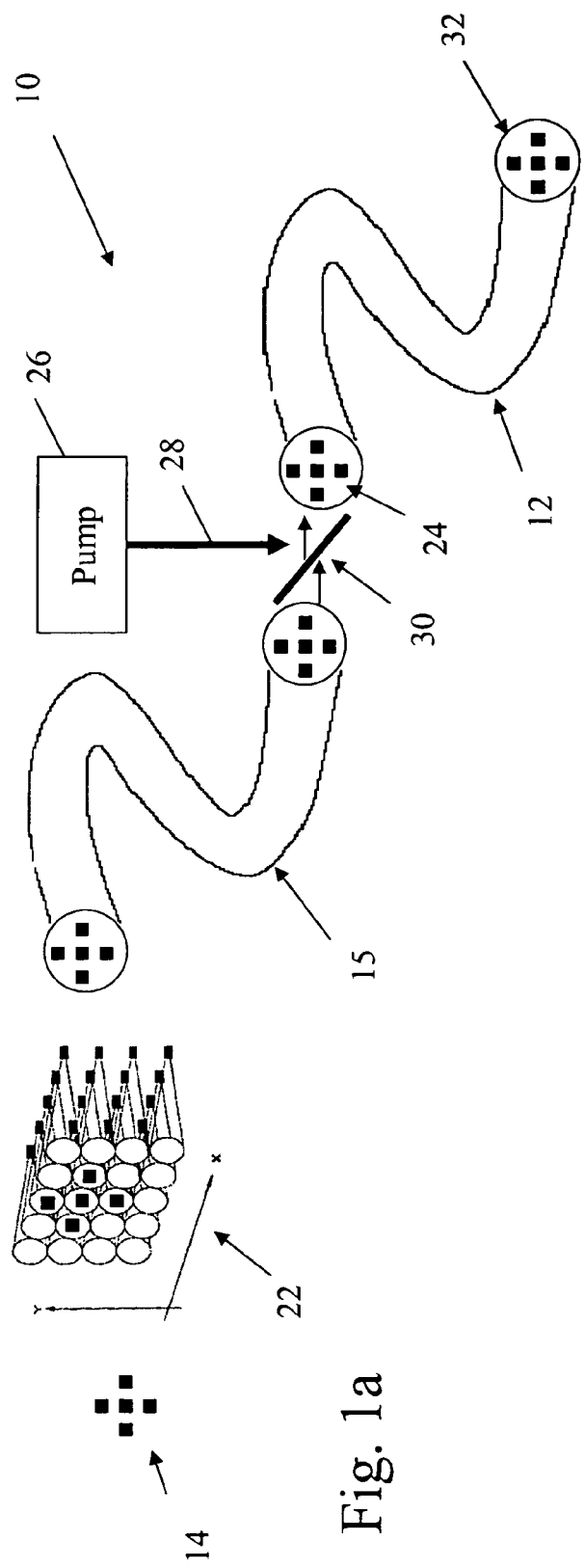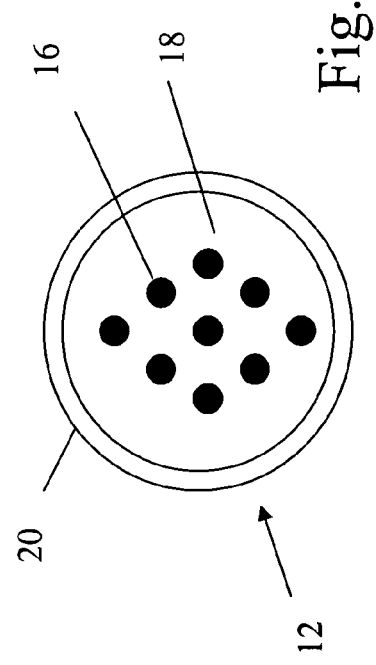
Fig. 1a
Fig. 1b

MULTI-CORE OPTICAL FIBER IMAGE AMPLIFIER AND METHOD OF DRAWING

GOVERNMENT RIGHTS

The U.S. Government has a paid-up license in this invention and the right in limited circumstances to require the patent owner to license others on reasonable terms as provided for by the terms of Grant No. FA9451-04M-0073 awarded by the Air Force Research Laboratory.

BACKGROUND OF THE INVENTION

1. Field of the Invention

This invention relates to image amplification and more specifically to a multi-core optical fiber image amplifier.

2. Description of the Related Art

Image amplification is typically not performed optically on the incident image. The common approach is to detect the light photons incident on a pixilated array, generate electrons, amplify the electron number, and then detect the number of electrons in each pixel of an electronics channel.

Electronic amplification is typically noisy and does not preserve either the phase or spectrum of the incident light field. Furthermore, if additional optical processing is to be performed the amplified electronic image must be converted back into an optical image. This O-E-O conversion limits the performance of the amplifier. Other approaches use, for example, a microchannel plate or wave mixing techniques.

A microchannel plate is a device which detects light at a photocathode and converts the incident photons to electrons. The plate creates an avalanche of electrons that are directed to hit a phosphor screen, which emits amplified light. A focal plane array is placed after the phosphor to detect the amplified light. The amplified light is at a different wavelength, all of the original phase information is lost and suffers from a lot of noise due to electron amplification.

Wave mixing uses the nonlinear mixing properties in photorefractive crystals to provide image amplification. The image to be amplified interferes with a strong pump beam—and the diffracted beam contains a copy of the image riding on top of a higher power beam. Examples of wave mixing amplifiers are described in S. Breugnot et al. "Low-noise preamplifier for multistage photorefractive image amplification" Optics Letters, Vol. 20, No. 14, p. 1568, Jul. 15, 1995; Sang-Kyung Choi et al. "Noiseless Optical Amplification of Images" Physical Review Letters, Volume 83, No. 10, p. 1938, Sep. 6, 1999 and E Lantzy et al. "Parametric amplification of images" Quantum Semiclass. Opt. 9 (1997) 279-286.

Coherent passive fiber bundles are used to transfer and/or magnify optical images, but not amplify. The fiber bundles may comprise individual passive fibers with a single core or a single fiber with multiple cores. SCHOTT's Wound Fiber Bundle includes a bundle of multi fibers with each multi fiber including an n×m array of passive core structures.

SUMMARY OF THE INVENTION

The present invention provides a low-noise, high-gain optical image amplifier.

This is accomplished with a multi-mode pump source that injects optical energy into an active fiber's inner cladding to excite the dopant ions in a 2-D array of doped cores and provide gain. The cores are arranged to sample and collect light from an image incident on one end of the fiber, amplify the light and output an amplified pixilated image at the other end of the fiber. The multi-core active fiber preserves the spatial pattern and spectrum of the incident image. The cores may be configured as single-mode cores to preserve phase information or multi-mode cores to scramble the phase information. It is often desirable for the gain to be approximately uniform across the 2-D array. This can be achieved by pumping uniformly doped cores into their respective saturation regions.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 1a and 1b are a diagram of a multi-core optical fiber amplifier and a section of the multi-core active fiber, respectively, in accordance with the present invention;

DETAILED DESCRIPTION OF THE INVENTION

Figure 2:
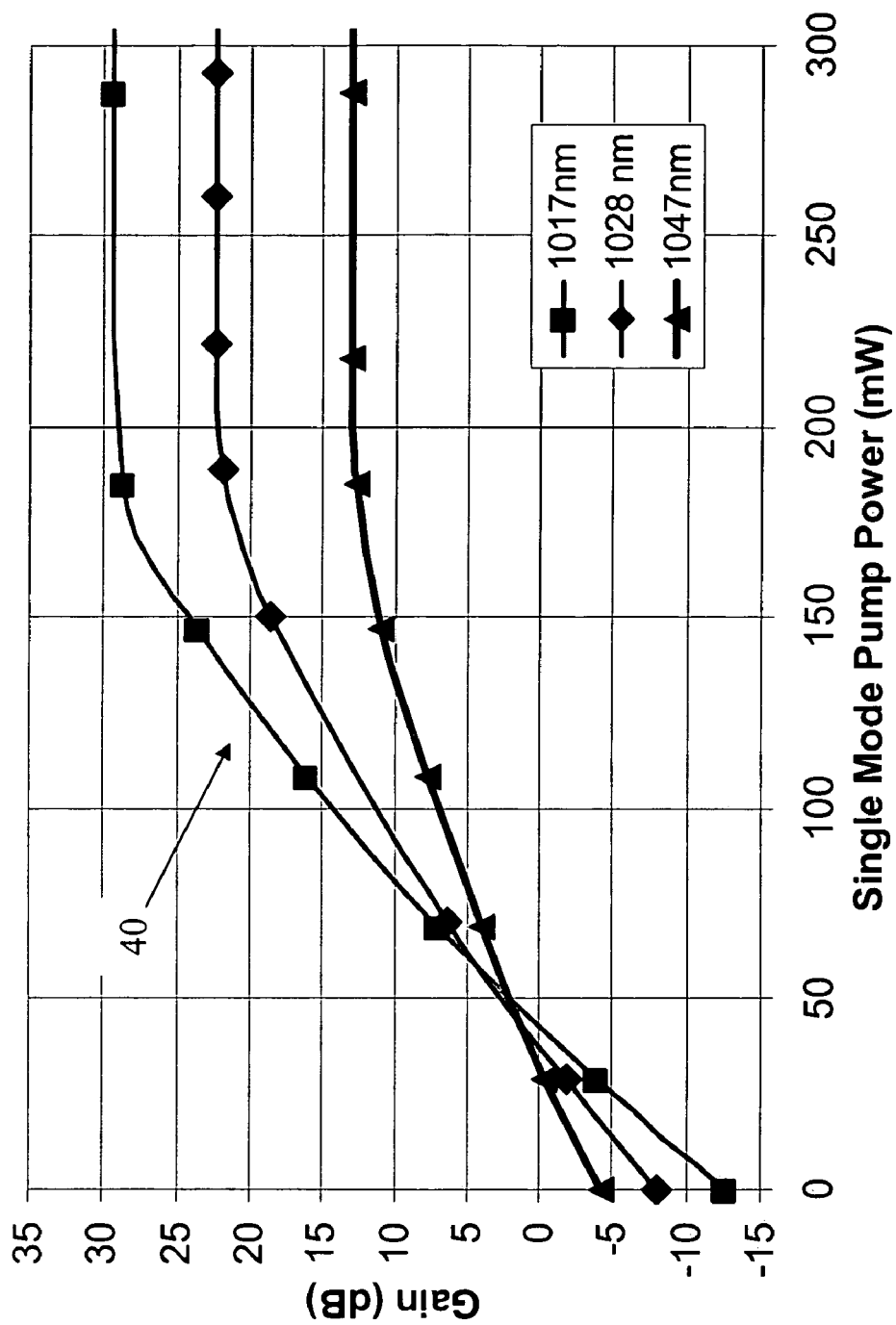
FIG. 2 is a plot illustrating the high gain performance over a wide wavelength band.

The present invention provides a low-noise, high-gain optical image amplifier that avoids the noise and loss of spectrum and phase information associated with O-E-O conversion.

As shown in FIGS. 1a and 1b, a fiber image amplifier 10 includes a multi-core active fiber 12 that optically amplifies an incident image 14. Direct optical amplification preserves the spectrum of the incident image, is lower noise and can be configured to preserve phase information if desired. Active fiber 12 includes a plurality of doped cores 16 arranged in a 2-D array inside an inner cladding 18, which is inscribed in an outer cladding 20. To amplify an "image", the 2-D array will typically include at least 9 doped cores.

Active fiber 12 is suitably optically coupled to a passive transport fiber 15. In this embodiment, a lenslet array 22 samples and collects light from image 14 into transport fiber 15, which in turn transports the pixilated image 24 to the active fiber. The transport fiber 15 may or may not be formed from the same host glass as active fiber 12 and may be formed as a single passive multi-fiber or a fiber bundle.

A multimode pump 26 such as a broad area single emitter laser diode or multiple emitter laser bar injects a pump 28 into the fiber chain via a pump coupler 30. Pump coupler 30 may be a WDM, a thin film dichroic beam splitter, a side-coupler such as Goldberg's V-groove as described in U.S. Pat. No. 5,854,865 or a total internal reflection (TIR) coupler as described in U.S. Pat. No. 6,529,318 entitled "Total Internal Reflection (TIR) Coupler and Method for Side-Coupling Pump Light into a Fiber". Pixilated image 24 is optically coupled from the passive transport fiber into the 2-D array of doped cores 16 in active fiber 12. This is suitably achieved by butt-coupling the two fibers or by a lens that images the light pattern from a facet of the passive fiber array to a facet of the active fiber. Pump 28 is coupled into active fiber 12 and confined to the inner cladding to excite the dopant ions in the cores and provide gain. Pixilated image 24 is optically amplified by the gain of each core and amplified image 32 is output at the end of the active fiber. Residual pump light is filtered by, for example, dichroic filter so as not to be confused with amplified signal light.

The design of a particular multi-core active fiber will depend upon a number of factors including the requirements of a specific application and the ability to draw multi-core fiber and to pump the cores efficiently. The core array size, core geometry including size, core-to-core spacing and arrangement, doping levels and mode coupling are all parameters that are dependent on the application. The multi-core active fiber may be implemented in standard silica glasses or in specialty multi-component glasses such as phosphate, silicate, germinate or tellurite glass. Multi-component glasses have the capability to support much higher doping concentrations of at least 0.5 wt. % and more typically at least 5 wt. % of a dopant oxide. Typical dopant ions include erbium (Er), ytterbium (Yb), thulium or neodymium. Multi-component glass active fibers can produce high gain in short fiber lengths over a wide bandwidth with a low noise figure. As shown in FIG. 2, a 6 cm 9-core active fiber formed from a phosphate glass host with 6 wt. % erbium-oxide dopant produces a gain response 40 of at least 13 dB over a 30 nm bandwidth from 1017-1047 nm with the gain at the shorter wavelengths being near 30 dB. The SNR of the amplified image is at least 0 dB, typically greater than 10 dB and preferably upwards of 20 dB. Such high SNRs are not achievable when using O-E-O conversion to amplify the image. High SNR allows the overall system to achieve much better performance or to achieve the same performance with less expensive readout circuits.

Figure 3:
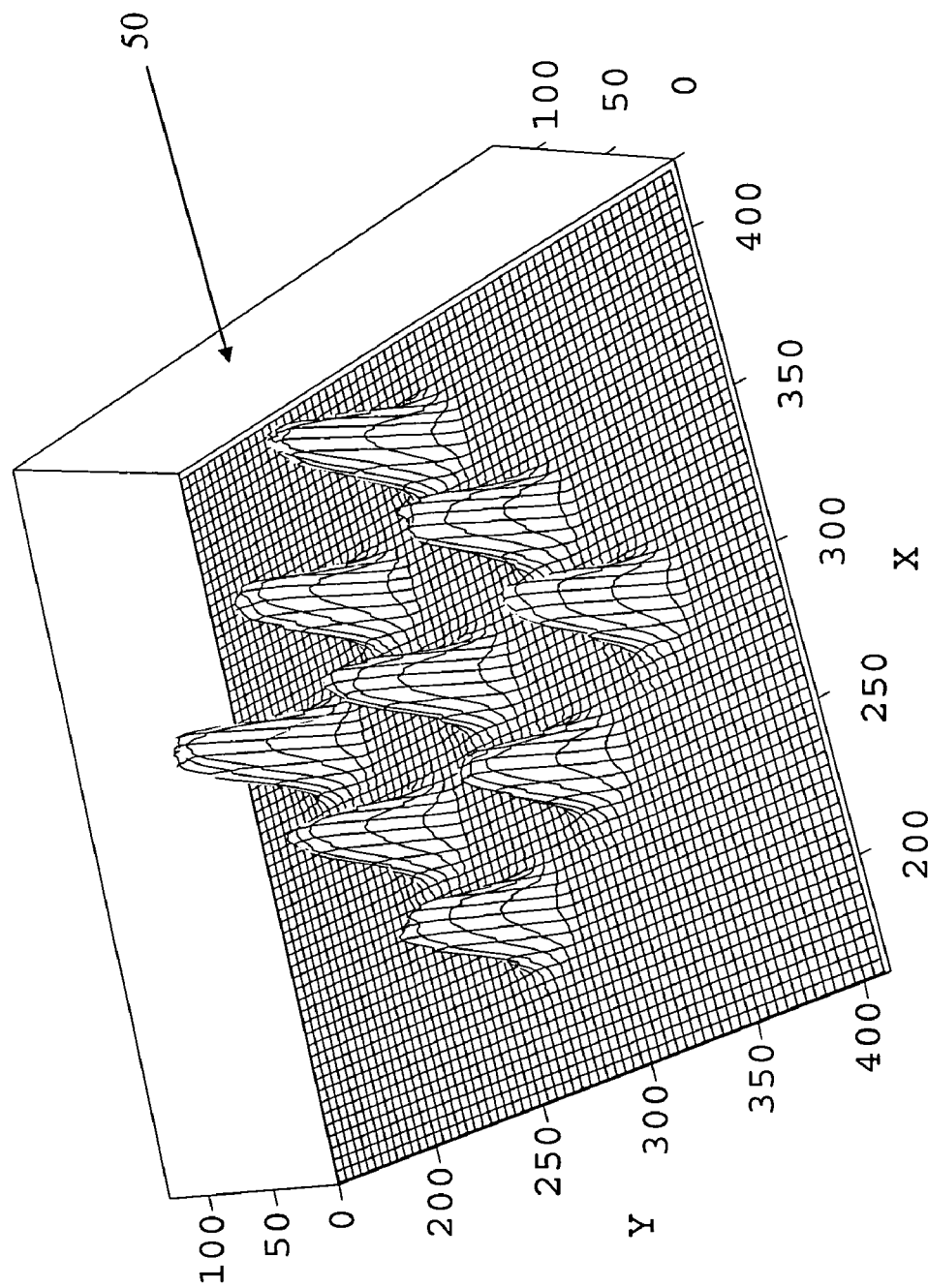
FIG. 3 is a plot illustrating achieved gain uniformity for the multi-core fiber amplifier.

In many applications, providing spatially uniform gain over a range of wavelengths for the input image will be a key performance parameter. As shown in FIG. 3, an 8 cm 9-core 6 wt. % yb-doped phosphate glass fiber has a demonstrated gain performance 50 of >16 dB per doped core with less than a 3 dB deviation over the array for a broadband signal of 1025 nm±15 nm. The ability to provide >10 dB gain per pixel that is approximately uniform, e.g. <3 dB deviation over the array, over a bandwidth of at least 10 nm and preferably at least 20 nm is important for direct optical amplification to be effective. In many of these applications it is also desirable to have no or minimal optical coupling between the cores. The cores shown in FIG. 3 had a 14 µm pitch and exhibit no measurable coupling.

Figure 4A:
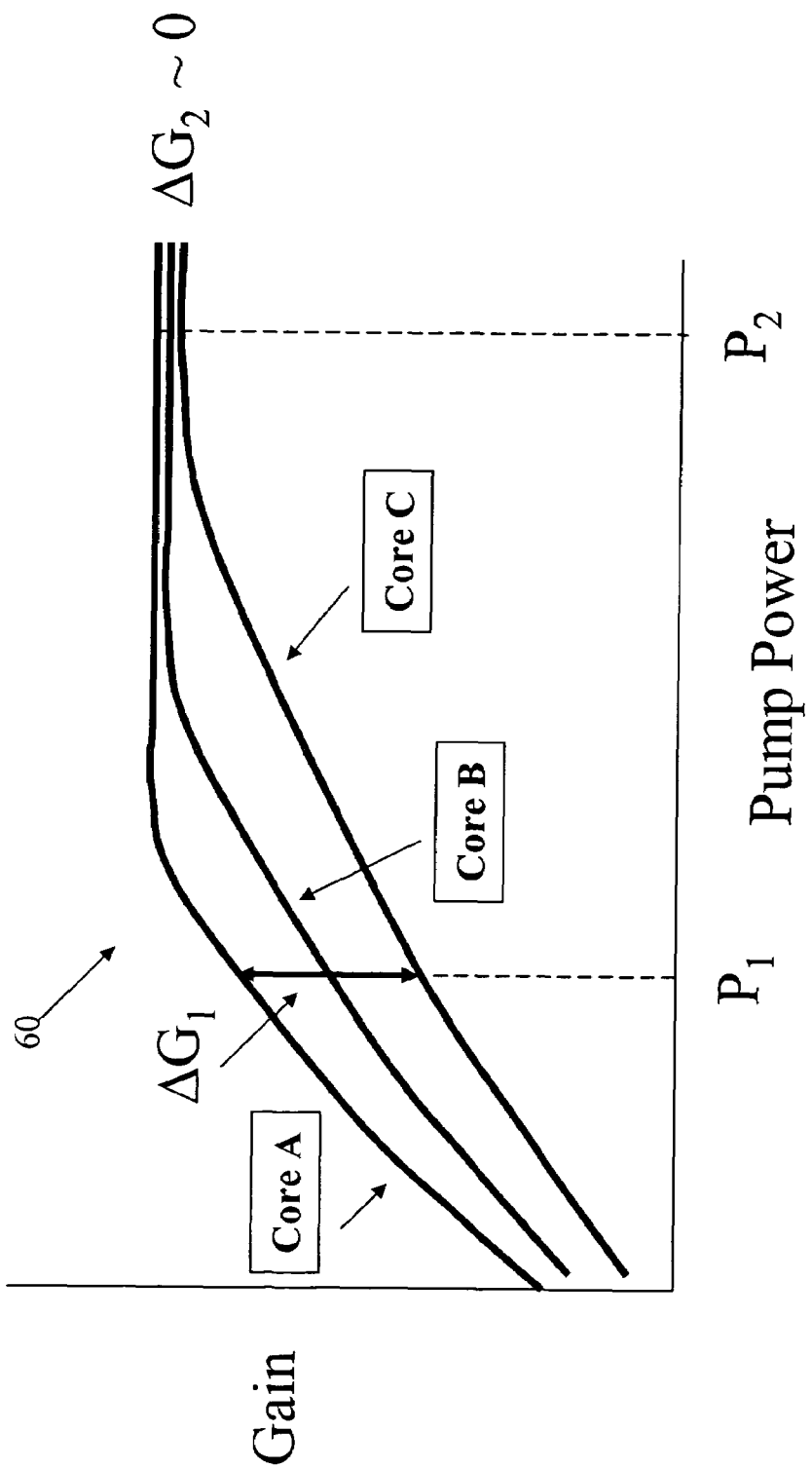
FIGS. 4a and 4b are plots of gain versus pump power illustrating different techniques to achieve uniform gain response.
Figure 4B:
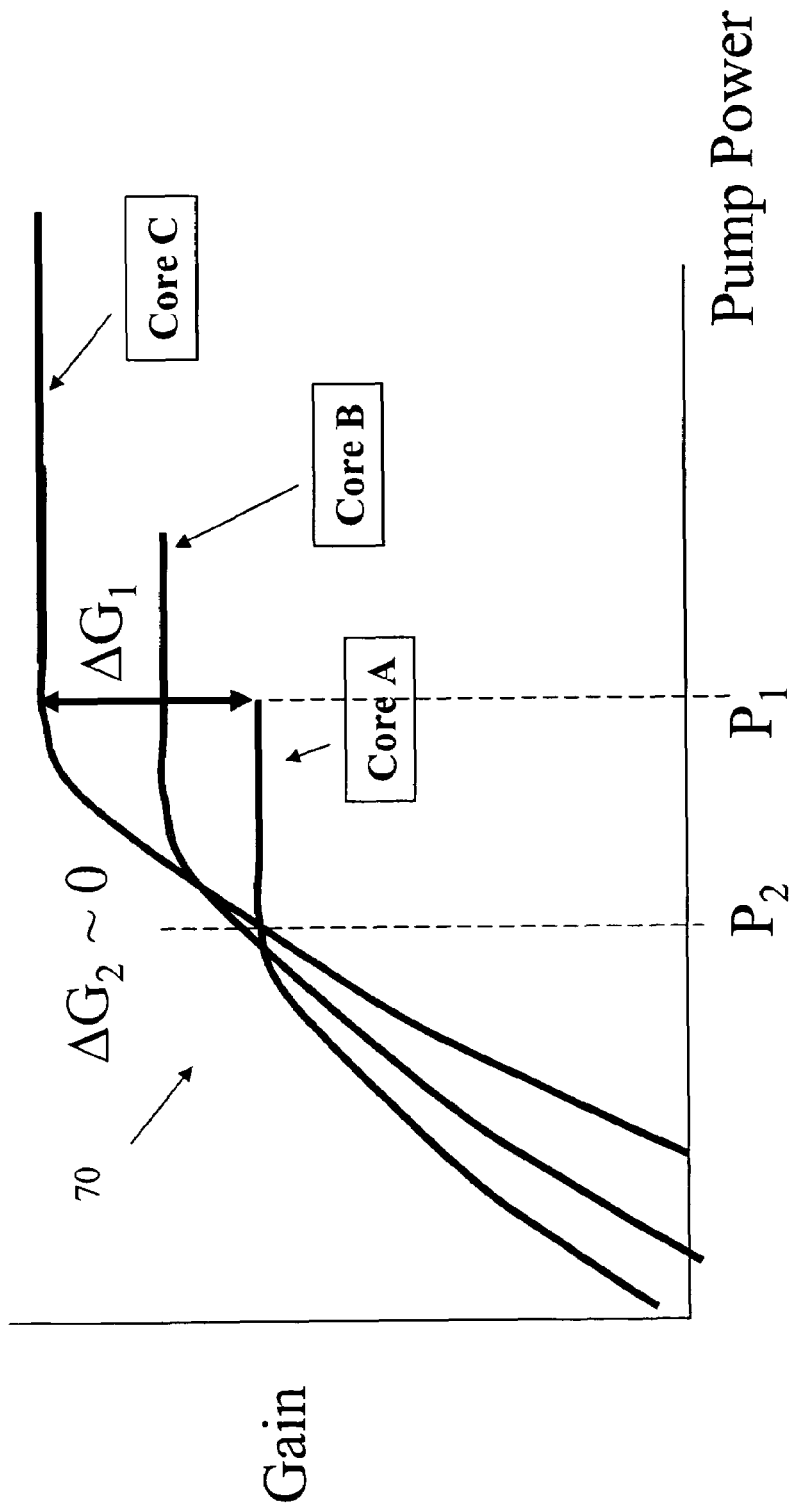

Gain uniformity is not inherent in a multimode-pumped multi-core active fiber. The absorption of the pump in the outer cores will typically be more/less than that in the inner cores creating a disparity in gain performance. This can be compensated for in a few different ways. As shown in FIG. 4a, the gain performance 60 of cores A, B and C having the same geometry and doping is considerably different within the region of linear amplification. However, because the cores are identical their saturated gain is approximately equal. Therefore if the pump power is set above the saturation point of the core having weakest gain response the gain will be approximately uniform across the array. As shown in FIG. 4b, outermost/innermost core C has a higher doping concentration than core B, which has a higher doping concentration than core A. Consequently, the cores have significantly different saturated gains but have approximately the same gain in a region where the lightest doped core A is saturated and cores B and C are linear. If the pump power is set at this point, the gain 70 will be approximately uniform across the array.

Figure 5B:
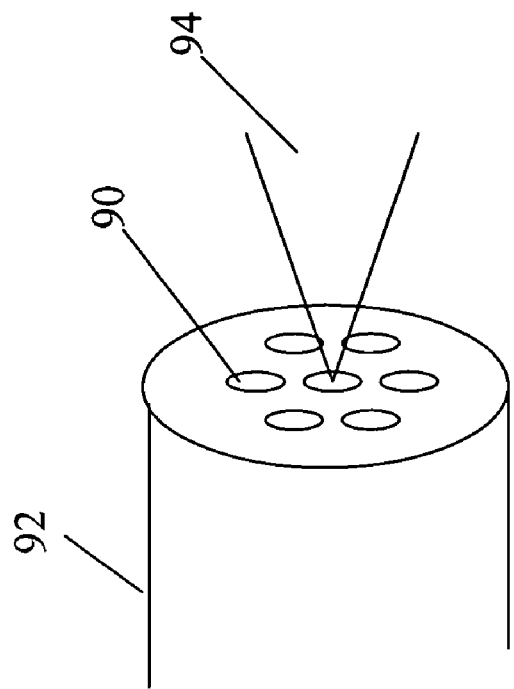
FIGS. 5a and 5b are respectively a diagram of a single-mode core that preserves phases and a diagram of a multi-mode-core that scrambles phase.
Figure 5A:
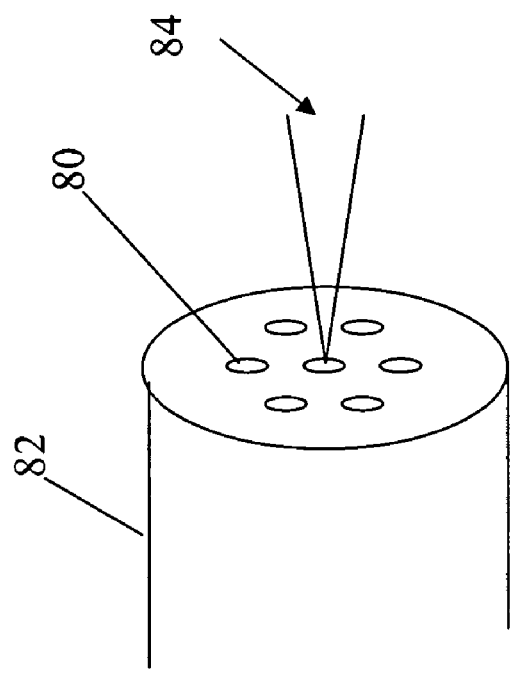
Figure 6:
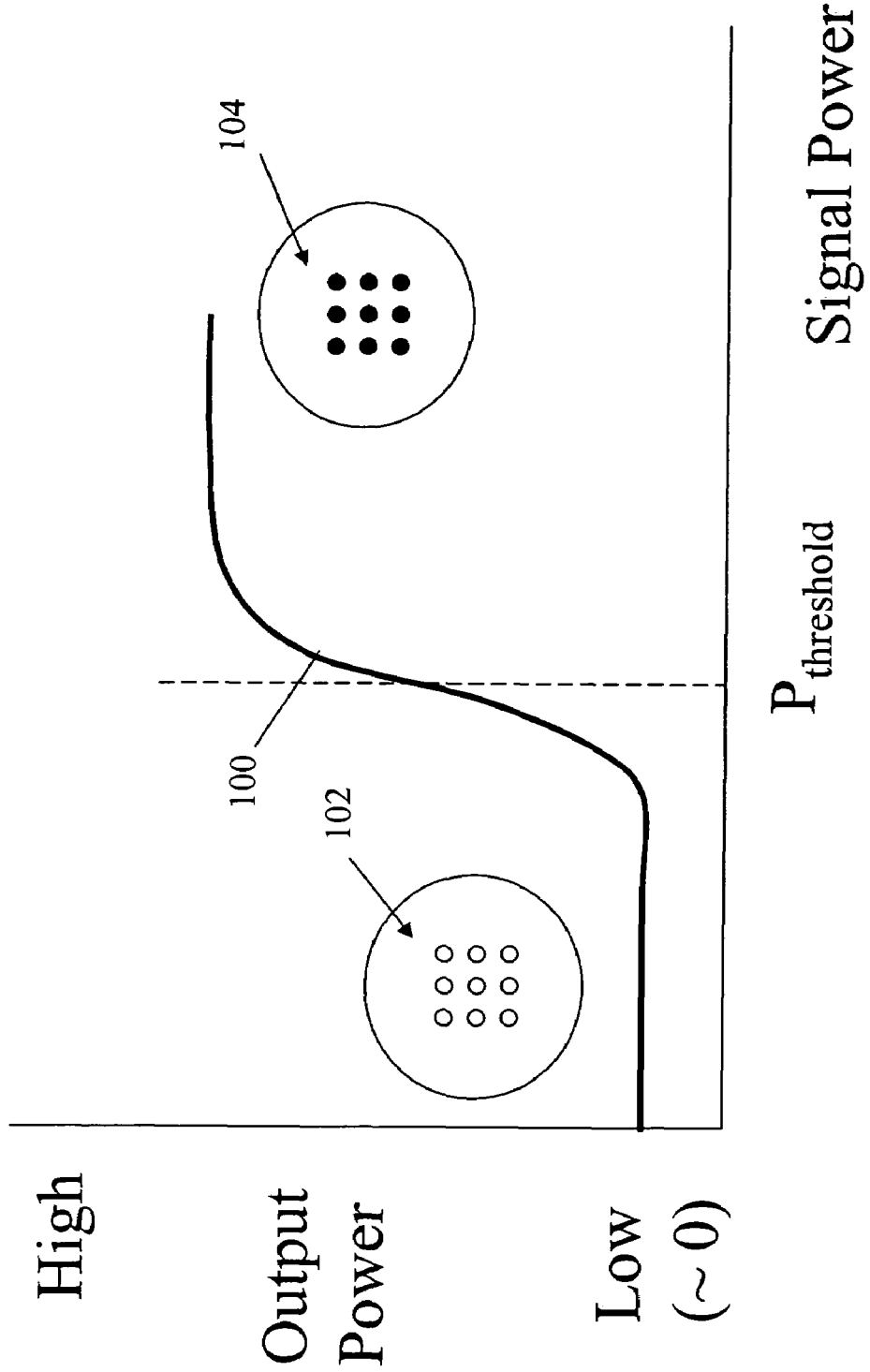
FIG. 6 is a diagram illustrating a configuration of the fiber amplifier as a non-linear processor.

As described above, typical O-E-O amplification destroys all of the phase information in the input image. As shown in FIGS. 5a and 5b, the fiber image amplifier can be configured to either preserve or scramble the input phase image. As shown in FIG. 5a, to preserve phase information the cores 80 in active fiber 82 have a generally smaller diameter and a lower numerical aperture (NA) 84 to form "single-mode" cores. As shown in FIG. 5b, to scramble phase information the cores 90 in active fiber 92 have a generally larger diameter and a higher NA 94 to form "multimode" cores. The exact values of the diameter and NA to achieve SM or MM performance is dependent upon the application.

The fiber image amplifier may itself be configured as a detector or non-linear element. For example, assume a system is configured to monitor a 3×3 array of optical sensors. If the signal power of any one of the sensors exceeds a threshold, the system is supposed to detect that occurrence and transmit a signal. The fiber image amplifier is suitably configured so that each doped core has a highly non-linear gain response 100 center around the detection threshold. If the signal power is low, the gain is low and the output remains low (transparent pixel 102). If the signal power exceeds the threshold, the saturated gain is high and the output switches high. In this particular embodiment, the cores are designed so that their mode fields strongly overlap. Consequently, if any one pixel is energized with signal power, power will be coupled into neighboring pixels and amplified into all of the pixels switching all of them high (darkened pixels 104). In this example, gain uniformity is not critical as long as the gain is sufficient to switch states.

Figure 7:
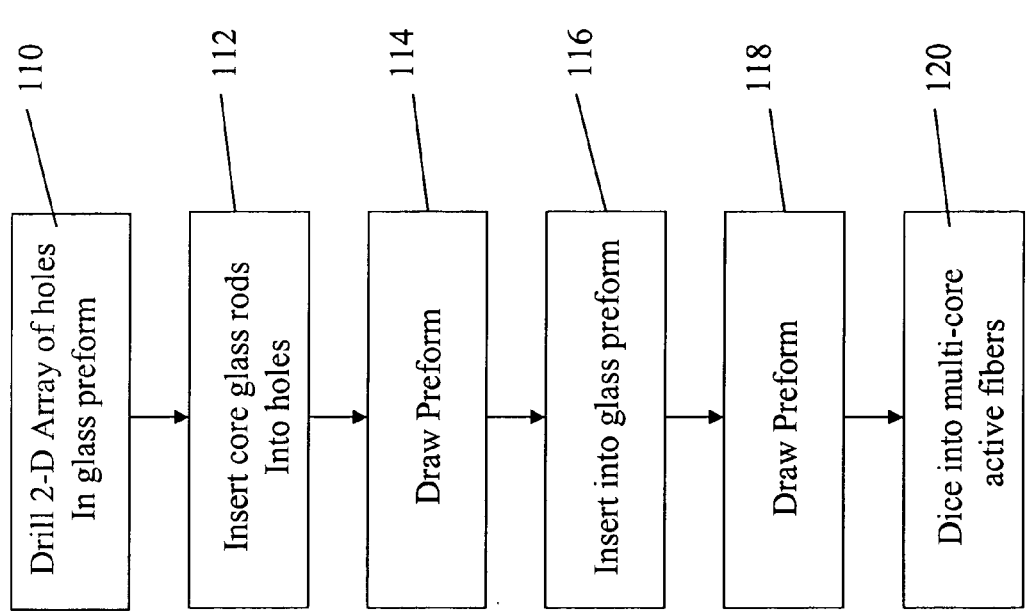
FIG. 7 is a flow diagram for drawing the multi-core active fiber.

As illustrated in FIG. 7, the multi-core active fiber is fabricated by drilling a 2-D array of holes in the inner cladding layer of a first glass preform (step 110). Core glass is machined into rods and inserted in the holes (step 112). The structure is drawn down to the desired size (step 114) and inserted into a second glass perform forming the outer cladding layer (step 116). The structure is drawn (step 118) and diced into a number of multi-core active fibers (step 120). This fabrication method offers tremendous flexibility in design and contrasts sharply with the more standard chemical vapor deposition method of pre-form fabrication for silica fibers. In addition, the optical fiber-drawing method is by its nature a low cost, highly scalable, and highly reproducible manufacturing approach.

Figure 8:
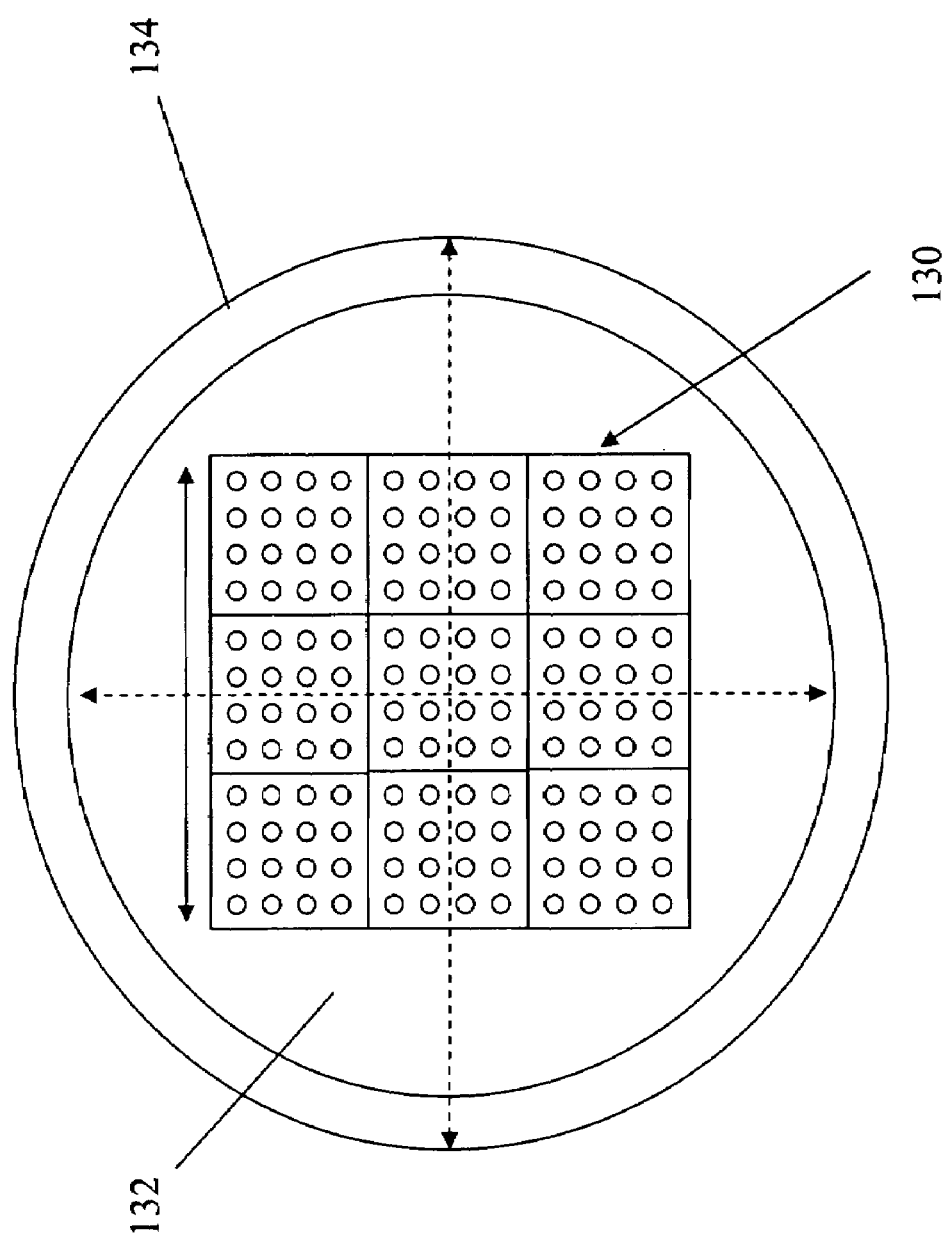
FIG. 8 is a diagram of a multi-core active fiber including a plurality of multiplexed multi-core fiber units.

For larger 2-D array sizes, either the first preform can be formed with a larger size array or, as shown in FIG. 8, "unit" multi-core fibers 130 can be multiplexed into the desired array size within an inner cladding 132 inscribed by an outer cladding 134. In this particular example, the drawing method of FIG. 7 is modified by providing a square first glass perform. The structure drawn in step 114 is diced into the fiber units, which are multiplexed and placed into a square hole in a second preform, which is itself placed into a circular hole in a third preform of the outer cladding glass. The second preform is more easily formed from the same index glass as the first preform. In this case the pump is only confined inside outer cladding 134. Alternately, the second and third performs could be formed of the same glass, and could be a single integrated preform. In this case the pump is confined within the fiber units, which may be more efficient.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An optical image amplifier, comprising:
a fiber including a 2-D array of doped cores in an inner cladding inscribed by an outer cladding, and
a multi-mode pump source that injects optical energy into the fiber's inner cladding to excite the dopant ions in the cores and provide gain,
wherein said cores are arranged to sample and collect light from an image incident on one end of the fiber, amplify the light and output an amplified pixilated image at the other end of the fiber, and
wherein the gain response of the doped cores over a spectral bandwidth is approximately uniform spatially across the 2-D array.

2. The optical image amplifier of claim 1, wherein the gain response preserves the spectrum of the incident image in the amplified pixilated image.

3. The optical image amplifier of claim 1, wherein the doped cores are single-mode and said gain response preserves the phase of the incident image in the amplified pixilated image.

4. The optical image amplifier of claim 1, wherein the gain response of the doped cores is uniform within 3 dB spatially across the 2-D array.

5. The optical image amplifier of claim 1, wherein the doped cores are uniformly doped and pumped into their respective saturation regions.

6. The optical image amplifier of claim 1, wherein at least some of the cores have different doping concentrations.

7. An optical image amplifier, comprising:
a fiber including a 2-D array of doped cores in an inner cladding inscribed by an outer cladding, and
a multi-mode pump source that injects optical energy into the fiber's inner cladding to excite the dopant ions in the cores and provide gain,
wherein said cores are arranged to sample and collect light from an image incident on one end of the fiber, amplify the light and output an amplified pixilated image having a SNR>0 dB at the other end of the fiber.

8. The optical image amplifier of claim 7, wherein the amplified pixilated image has a SNR>10 dB.

9. An optical image amplifier, comprising:
a fiber including a 2-D array of doped cores in an inner cladding inscribed by an outer cladding, wherein the cores are doped with at least 0.5 wt. % of a rare earth dopant oxide selected from erbium, ytterbium, thulium, neodymium oxides or combinations thereof and wherein the cores and inner and outer cladding layers are a multi-component glass, and
a multi-mode pump source that injects optical energy into the fiber's inner cladding to excite the dopant ions in the cores and provide gain,
wherein said cores are arranged to sample and collect light from an image incident on one end of the fiber, amplify the light and output an amplified pixilated image at the other end of the fiber.

10. An optical image amplifier, comprising:
a fiber including a 2-D array of doped multi-mode cores in an inner cladding inscribed by an outer cladding, and
a multi-mode pump source that injects optical energy into the fiber's inner cladding to excite the dopant ions in the cores and provide gain,
wherein said cores are arranged to sample and collect light from an image incident on one end of the fiber, amplify the light and output an amplified pixilated image at the other end of the fiber, said amplifier using the gain from excited dopant ions in the multi-mode cores to scramble the phase of the incident image spatially across the 2-D array in the amplified pixilated image.

11. An optical image amplifier, comprising:
a fiber including a 2-D array of doped cores in an inner cladding inscribed by an outer cladding, and
a multi-mode pump source that injects optical energy into the fiber's inner cladding to excite the dopant ions in the cores and provide gain,
wherein said cores are arranged to sample and collect light from an image incident on one end of the fiber, amplify the light and output an amplified pixilated image at the other end of the fiber, said amplifier providing at least 10 dB gain per core with less than 3 dB gain variation over the 2-D array over a bandwidth of at least 10 nm with a SNR of at least 0 dB.

12. The optical image amplifier of claim 11, wherein the amplifier has a SNR of at least 10 dB.

13. The optical image amplifier of claim 1, wherein the 2-D array includes at least nine doped cores.

* * * * *